United States Patent [19]

Goodman

[11] 4,166,041

[45] Aug. 28, 1979

[54] PROCESS FOR MAGNESIUM SCALE CONTROL USING MIXTURES OF POLYCATIONIC AND POLYANIONIC POLYMERS

[75] Inventor: Richard M. Goodman, Norwalk, Conn.

[73] Assignee: American Cyanamid Company, Stamford, Conn.

[21] Appl. No.: 860,911

[22] Filed: Dec. 15, 1977

[51] Int. Cl.$^2$ ................................................ C02B 5/06
[52] U.S. Cl. ...................................... 252/180; 210/58
[58] Field of Search .................. 252/180, 175; 210/58; 203/7; 526/923

[56] References Cited

U.S. PATENT DOCUMENTS

| | | |
|---|---|---|
| 3,288,770 | 11/1966 | Butler .............................. 260/47 R X |
| 3,661,880 | 5/1972 | Markert et al. .................. 260/89.5 N |
| 3,706,717 | 12/1972 | Siegele ............................. 252/180 X |
| 3,715,307 | 2/1973 | Johnson ........................... 252/180 X |
| 3,738,945 | 6/1973 | Panzer et al. .................. 210/54 C X |
| 3,810,834 | 5/1974 | Jones et al. ....................... 252/180 X |
| 3,985,671 | 10/1976 | Clark ....................... 252/DIG. 11 X |
| 4,065,607 | 12/1977 | Kurowsky ....................... 252/180 X |
| 4,072,607 | 2/1978 | Schiller et al. .................. 252/180 X |
| 4,085,060 | 4/1978 | Vassileff ............................. 252/180 |

*Primary Examiner*—Harris A. Pitlick
*Attorney, Agent, or Firm*—William J. van Loo

[57] ABSTRACT

Magnesium hydroxide scale formation in evaporative desalination units is inhibited by adding to the saline water being processed a mixture of certain polycationic polymers and polyanionic polymers derived from an ethylenically unsaturated dibasic acid or an ethylenically unsaturated sulfonic acid.

10 Claims, No Drawings

PROCESS FOR MAGNESIUM SCALE CONTROL USING MIXTURES OF POLYCATIONIC AND POLYANIONIC POLYMERS

CROSS-REFERENCE TO RELATED CASE

This application is related to application Ser. No. 860,914 filed on even date herewith. The instant application is directed to a process of inhibiting scale formation using a mixture of polyanionic and polycationic polymers and the related case is directed to the mixture of polyanionic and polycationic polymers.

This invention relates to a process for inhibiting magnesium scale formation in evaporative desalination units. More particularly, this invention relates to such a process wherein by adding to the saline water being processed a mixture of a polyanionic polymer derived from an unsaturated dibasic acid and/or an unsaturated sulfonic acid and a polycationic polymer, the time of operation of evaporative desalination units without significant loss of efficiency due to scale formation or sludging can be greatly extended.

Desalination is a process for removing soluble salts from water containing them to render such water potable or useful in operations where the original dissolved salt content is unacceptable. Desalination is an important process for providing potable water from sea water in arid areas where other sources of water are limited. Desalination is also an important process for removing salts from waste waters so that such waters can be recycled or safely discharged into natural waters.

Desalination may be an evaporative process carried out in desalination units that may be operated under vacuum, at atmospheric pressure, or at super atmospheric pressure. The use of vacuum or superatmospheric pressures are more difficult and costly to employ in conjunction with desalination units, and accordingly, the preferred procedure of operation is essentially at atmospheric pressure. In operating such desalination units, the temperature of operation, which is dependent upon the operating pressure employed, influences the nature of the scaling that occurs. At atmospheric pressure a transition point occurs at a temperature between about 80° C. and about 90° C., below which the scale formation is due to calcium carbonate and above which the scale formation is due to magnesium hydroxide. While scale formation due to calcium carbonate can be controlled by a number of useful additives, the problem of magnesium hydroxide scale or sludge control in evaporative desalination units has not been satisfactorily solved. Thus, although evaporative desalination units are potentially efficient in the desalination of sea waters and waters of high salt contents, the rapid formation of magnesium scaling or sludging reduces efficiency, necessitating shut-down and scale or sludge removal from the desalination units. The loss of operating time and the difficulties of scale or sludge removal severely limit the amount of water processed by a desalination unit in a given time period and add to the cost of processed water.

A number of methods have previously been proposed for decreasing deposition of scale from sea water onto metal surfaces and involve the use of certain chelating agents. One such method involves addition of polyphosphate-lignosulfonate mixtures, such as described in U.S. Pat. No. 2,782,162 to Fidell. However, these mixtures are not effective in saline waters at high temperatures and result in calcium phosphate sludge.

Also, certain polyelectrolytes, such as sodium polyacrylate, are effective in preventing calcium carbonate scale at high temperatures, see South African patent application No. 680,947, but are ineffective against magnesium scales, as shown herein.

U.S. Pat. No. 3,981,779 to Block teaches use of a chelate surfactant selected from N-lauryliminodiacetic acid, N-oleyliminodiacetic acid, oleoyliminodiacetic acid, and their ammonium and alkali metal salts. While these agents do decrease magnesium hydroxide scale deposition to some extent, the extent of decrease is marginal.

U.S. Pat. No. 3,985,671 to Clark teaches use of a blend of a polyaminoalkylene phosphate and a polyquaternary ammonium chloride as a scale control agent for recirculating water cooling equipment, the combination is shown to be effective in extending the saturation point of calcium carbonate, but no information is given as to its effectiveness in preventing magnesium hydroxide scaling. However, such combination is found upon evaluation to be ineffective in preventing magnesium hydroxide scaling to any desirable extent.

There exists, therefore, the need for a process for inhibiting formation of magnesium scale or sludge in the operation of evaporative desalination units. Such a provision would fulfill a long-felt need and result in a significant advance in the art.

In accordance with the present invention, there is provided a process for inhibiting formation of magnesium scale or sludge in evaporative desalination units which comprises adding to the water being processed an effective amount of a mixture of (1) a polyanionic polymer containing at least about 50 mol percent of repeating units derived from an ethylenically unsaturated dibasic acid or an ethylenically unsaturated sulfonic acid and any balance of repeating units derived from one or more monomers compatible therewith, the acid units being in the form of at least one member selected from the group consisting of free acid radical, ammonium salt, and alkali metal salts, and (2) a polycationic polymer selected from the group consisting of (a) dimethylamine-polyamine-epichlorohydrin reaction product wherein the amount of said polyamine is from 0 to about 15 mol percent of the total amine content and the amount of said epichlorohydrin is from at least the molar equivalent of the total amine content up to the full functional equivalent of said amine content, (b) poly(dimethyldiallylammonium chloride), (c) quaternarized derivatives of poly(dimethylaminoethylmethacrylate), and (d) poly[oxyethylene(dimethylimino)ethylene(dimethylimino)ethylene dichloride], said polyanionic polymer having a molecular weight in the range of about 500 and about 50,000, said polycationic polymer having a molecular weight in the range of about 1,500 and 500,000, and the molar ratio of said polycationic polymer to said polyanionic polymer based on the average molecular weight of the repeating units therein being in the range of about 1.5:1 and about 25:1, respectively.

Use of the process of the present invention in association with evaporative desalination units enables such units to be operated for greatly extended time periods at high efficiency. This result is highly surprising and completely unexpected in view of the fact that the polyanionic polymer is ineffective in the inhibition of magnesium floc formation when used alone and the polycationic polymer is completely ineffective as an anti-scaling agent when used alone. in addition to its ability to inhibit magnesium hydroxide scale or sludge formation, the process of the present invention is also effective against calcium carbonate scaling, thu providing protection against scale formation at a wide range of operating temperatures.

The polyanionic polymer useful in the process of the present invention is a polymer containing at least about 50 mole percent of repeating units derived from an ethylenically unsaturated dibasic acid and/or an ethylenically unsaturated sulfonic acid. Ethylenically unsaturated dibasic acids are those that undergo free radical polymerization and include maleic and fumaric acids. Ethylenically unsaturated sulfonic acids also undergo free radical polymerization and include allylsulfonic acid. Any balance of repeating units of the polyanionic polymer is derived from one or more monomers compatible therewith. Preferred species include homopolymers of maleic acid and fumaric acid and copolymers of allylsulfonic acid and either of these acids. The acid units of the polyanionic polymer may be in the free acid form, ammonium salt form, or alkali metal salt form. The useful polyanionic polymers will have a molecular weight in the range of about 500 to about 50,000. The polyanionic polymers in the form and molecular weight range specified, must be water-soluble in useful concentrations so as to provide the level of effective dosage for use.

By the term "monomers compatible with" is meant those monomers which, when used to provide repeating units in the polyanionic polymer, provide units in amounts which do not intefere with the function of the acid groups present or adversely affect the solubility of the resulting polymer. Suitable compatible monomers include acrylamide, methacrylamide, acrylonitrile, methacrylonitrile, vinyl acetate, methyl vinyl ether, and the like. The polyanionic polymer may be prepared by conventional polymerization procedures using the selected monomer content of may be obtained by the hydrolysis of suitable polymers containing such starting monomers as will provide the desired hydrolysis products following conventional procedures. Polyanionic polymers useful in the process of the present invention are known in the art and, therefore, do not need any further discussion herein.

The polycationic polymer may be any of four types. A first type is generally described in U.S. Pat. No. 3,738,945 issued to Panzer et al. on June 12, 1973, except that in the process of the present invention the secondary amine is dimethylamine and the epoxy compound is epichlorohydrin or precursors thereof. Such a polycationic polymer is the reaction product of dimethylamine, 0 to 15 mole percent of a polyfunctional amine based on the total amine content and epichlorohydrin, the amount of epichlorohydrin being from at least equimolar to the total amine content to about the full functional equivalency of the total amine content. The polymer should be water-soluble and have a molecular weight in the range of about 1,500 and 500,000, preferably about 10,000 to 200,000.

A second type of polycationic polymer is one consisting of repeating units of dimethyldiallylammonium chloride as disclosed in U.S. Pat. No. 3,288,770 issued to Butler on Nov. 29, 1966. This polymer is referred to as Poly(dimethyldiallylammonium chloride) and should have a molecular weight in the range of about 1,500 and about 500,000, preferably about 10,000 to about 500,000.

A third type of polycationic polymer is a quaternarized derivative of poly(dimethylaminoethylmethacrylate). This polymeric type is described in U.S. Pat. No. 2,892,822 issued June 30, 1959 to Gray et al. These polymers also should have molecular weights in the range of about 1,500 and about 500,000, preferably about 10,000 to about 200,000.

A fourth type of polycationic polymer is poly[oxyethylene(dimethylimino)ethylene(dimethylimino)ethylene dichloride]. This polymer in a limited range of viscosities is described in U.S. Pat. No. 3,985,671 issued Oct. 12, 1976 to Clark. The polymer is obtained by reacting dimethylamine and ethylene dichloride. This polymer will also have a molecular weight in the range of about 1,500 and about 500,000, preferably about 3,000 to 50,000.

Both the polyanionic and polycationic polymers should be water-soluble polymers which in admixture are soluble at the concentrations at which they are to be used. Generally, these polymers are available as concentrated aqueous solutions which can be conveniently mixed in proper amounts to form the compositions to be used in the process of the present invention as concentrates which are then readily diluted to the concentration of use. In preparing compositions for use in the process of the present invention, the relative proportions of the two polymers employed will be such that the molecular ratio of the polycationic polymer to the polyanionic polymer based on the average molecular weight of repeating units therein will be in the range of about 1.5:1 to about 25:1, preferably about 1.5:1 to about 5:1. For example, in a polyanionic polymer composed of 90 mole percent of sodium maleate units MW=160, and 10 mole percent of acrylamide units, MW=71, the average molecular weight of the repeating unit will be 151.1. Similarly, the repeating units of a polycationic polymer composed of the reaction product of methylamine and epichlorohydrin will have a molecular weight of 137.5.

In carrying out the process of the present invention, the mixed polymer composition is added to the water being processed in an evaporative desalination unit in an effective amount. By an effective amount is meant that amount which provides an increased operating time without significant formation of magnesium hydroxide scale or sludge. The specific amount of polymer mixture that will be effective in all instances cannot be stated in a precise manner because the amount will vary widely due to the number of variables including the water being processed, the conditions of operation of the desalination unit, the nature of the polymer mixture employed, and the like. An effective dosage, however, will generally be found in the range of about 0.1 and 100 parts polymer mixture per million parts of water. A preferred range is generally about 5 to 50 ppm.

The invention is more fully illustrated by the examples which follow wherein all parts and percentages are by weight unless otherwise specified.

Since the evaluation of scale inhibitors in commercial type desalination units involves large quantities of chemical additives, copious quantities of process water, considerable expenditures of power to effect vaporization, it is desirable to employ a small-size laboratory screening method whereby the suitability of processed additives can be predicted with accuracy. The following laboratory method was employed in the examples which follow and subsequent large scale evaluations on commercial type equipment verified the accuracy of its predictions.

LABORATORY PROCEDURE

1. To a 150 milliliter (ml) capacity beaker containing 68 mls. of deionized water are added 5.4 mls. of 0.10 N sodium hydroxide.
2. To the solution obtained above are added 5 mls. of a 900 parts per million (ppm) stock solution of the agent of test, giving 50 ppm on the final contents of the beaker.
3. After thoroughly mixing the resulting composition, 11.55 mls. of magnesium stock solution (6.0 grams Mg. $(NO_3)_2 6H_2O$ in 1 liter of water) are added and heating to 90° C. with stirring is effected.
4. The beaker is then removed from the heat source and allowed to cool at ambient conditions.

A blank, no additive employed, run in this manner shows a white floc of hydrated magnesia which settles out in about twenty minutes. Ineffective scale inhibitors will have little or no effect on the rate of settling of hydrated magnesia. Effective scale inhibitors show significant increase in settling time of hydrated magnesia.

Following the Laboratory Procedure and using as the polyanionic polymer a copolymer of 90 mole percent of acrylic acid and 10 mole percent of acrylamide having a molecular weight of about 1,000, the following polycationic polymers were found to provide polymer mixtures of ineffective scale inhibiting properties at any molar ratio of polycationic polymer to polyanionic polymer:

Melamine-formaldehyde acid colloids
Mannich bases of polyacrylamide
Polyethylenimines
Cationic starches
Polyamines obtained by condensation of ammonia and ethylene dichloride
Polymeric reaction products of methylamine and epichlorohydrin.

Using the same polyanionic polymer, polymeric condensates of alkylenediamines and dicarboxylic acid, a nonionic polymer, in admixture therewith did not provide effective scale inhibition. Using as the polycationic polymer, the reaction product of dimethylamine and epichlorohydrin and as the polyanionic polymer a polyalkylenephosphonate described in U.S. Pat. No. 3,985,671, an ineffective scale inhibitor was obtained. Thus, numerous combinations of polyanionic and polycationic polymers are ineffective as scale inhibitors and it is surprising that the specific combinations of the present invention should be effective scale inhibitors.

EXAMPLE 1

Using the Laboratory Procedure described above, the following run was made. The polyanionic polymer was a 50% aqueous solution of maleic acid homopolymer of molecular weight 500 in the form of the sodium salt. The polycationic polymer was a 50% aqueous solution of the reaction product of an amine composition consisting of 98 mole percent of dimethylamine and 2 mole percent of ethylenediamine with an amount of epichlorohydrin equal to the full functionality of the two amines, the product having a molecular weight of about 10,000. The mole ratio of polycationic polymer to polyanionic polymer was 1.5:1, respectively, and was obtained by adding 4.0 parts of the polycationic polymer to 3.1 parts of the polyanionic polymer. A free-flowing homogeneous composition dilutable with water in all proportions was obtained. Evaluation of this composition as described in the Laboratory Procedure resulted in the prevention of magnesium hydroxide floc for five days.

COMPARATIVE EXAMPLE A

An evaporative desalination unit operating at atmospheric pressure was run with sea water employing no additive to control scale formation. After approximately 24 hours of operation, heat transfer efficiency was lost due to magnesium scale formation and operation had to be stopped to remove the scale formation.

COMPARATIVE EXAMPLE B

Using a desalination unit as in Comparative Example A, a polycationic polymer, which was the reaction product of a mixture of 98 mol percent of dimethylamine, 2 mol percent of ethylenediamine, and an amount of epichlorohydrin equal to the full functional equivalency of the two amines employed and of molecular weight 10,000 was added to the sea water being processed in the amount of 20 parts per million. After approximately 19 hours of operation, heat transfer efficiency was lost due to magnesium scale formation and operation had to be stopped to remove the scale formation.

COMPARATIVE EXAMPLE C

The procedure of Comparative Example B was followed except that instead of the polycationic polymer employed therein, there was employed at 20 ppm a polyanionic polymer which was a homopolymer of maleic acid in the form of the sodium salt and of molecular weight 500. Operation of the desalination unit had to be stopped after about 48 hours due to plugging with magnesium hydroxide flocs.

EXAMPLE 2

The composition described in Example 1 is added to the sea water being processed in a desalination unit as used in Comparative Example A in the amount of 20 ppm total polymer content. Heat transfer efficiency was maintained without the formation of scale or sludge for at least 110 hours. Compared to the result obtained in Comparative Example A, this represents an improvement in operating time of at least about 450%.

EXAMPLE 3

The procedure of Example 1 is repeated except that in place of the polyanionic polymer used therein there was employed a copolymer consisting of 50 mol percent of allyl sulfonic acid and 50 mol percent of maleic acid, the acid groups being in the form of the sodium salts and the molecular weight being 1,500. The component polymers were mixed in proportions such as to provide a ratio of polycationic polymer to polyanionic polymer of 3.3:1, respectively, based on the average molecular weight of the repeating units. The composition was dilutable with water in all proportions and provided similar results in scale inhibition in the Laboratory Procedure to those obtained with the composition of Example 1.

EXAMPLE 4

The procedure of Example 1 was again followed except that in place of the polyanionic polymer used therein there was used a copolymer of 50 mol percent of allylsulfonic acid and 50 mol percent of fumaric acid, the acid groups being in the form of the sodium salts and the molecular weight being 1,500. The component polymers were mixed in proportions such as to provide a ratio of polycationic polymer to polyanionic polymer of 5:1, respectively, based on the average molecular weight of the repeating units. The composition was dilutable with water in all proportions and provided similar results in scale inhibition in the Laboratory Procedure to those obtained with the composition of Example 1.

EXAMPLES 5-7

Again following the procedure of Example 1, a series of compositions are prepared and evaluated as scale inhibitors in the Laboratory Procedure. The compositions and ratios of components employed are given in Table I below which also identifies the example number. In each instance, the resulting composition is dilutable with water in all proportions and provides scale inhibition results in the Laboratory Procedure equivalent to that obtained with the composition of Example 1.

TABLE I

| Example | Polyanionic Polymer (A) | Polycationic Polymer (B) | Ratio B/A |
|---------|-------------------------|--------------------------|-----------|
| 5 | Homopolymer of Maleic Acid, Na Salt MW=500 | Poly(dimethyldiallyl ammonium chloride) MW=100,000 | 2/1 |
| 6 | Homopolymer of Fumaric Acid, Na Salt MW=500 | Poly(trimethylaminoethyl methacrylate methosulfate) MW=500,000 | 3/1 |
| 7 | Copolymer 50 mol percent Maleic acid and 50 mol percent allylsulfonic acid, Na Salt, MW=1500 | Poly[oxyethylene(dimethylimino) ethylene (dimethylimino) ethylene dichloride] MW=3,400 | 4/1 |

I claim:

1. A process for inhibiting formation of magnesium scale or sludge in evaporative desalination units which comprises adding to the water being processed an effective amount of a mixture of (1) as polyanionic polymer containing at least about 50 mol percent of repeating units derived from an ethylenically unsaturated dibasic acid or an ethylenically unsaturated sulfonic acid and any balance of repeating units derived from one or more monomers compatible therewith, the acid units being in the form of at least one member selected from the group consisting of free acid radical, ammonium salt, and alkali metal salts, and (2) a polycationic polymer selected from the group consisting of (a) dimethylamine-polyamine-epichlorohydrin reaction product wherein the amount of said polyamine is from 0 to about 15 mol percent of the total amine content and the amount of said epichlorohydrin is from at least the molar equivalent of the total amine content up to the full functional equivalent of said amine content, (b) poly(dimethyldiallylammonium chloride), (c) quaternarized derivatives of poly(dimethylaminoethylmethacrylate), and (d) poly[oxyethylene(dimethylimino)ethylene(dimethylimino)ethylene dichloride], said polyanionic polymer having a molecular weight in the range of about 500 and about 50,000, said polycationic polymer having a molecular weight in the range of about 1,500 and 500,000, and the molar ratio of said polycationic polymer to said polyanionic polymer based on the average molecular weight of the repeating units therein being in the range of about 1.5:1 to 25:1, respectively.

2. The process of claim 1 wherein said polyanionic polymer is a homopolymer of maleic acid.

3. The process of claim 1 wherein said polyanionic polymer is a homopolymer of fumaric acid.

4. The process of claim 1 wherein said polyanionic polymer is a copolymer of 50 mol percent of maleic acid and 50 mol percent of allyl sulfonic acid.

5. The process of claim 1 wherein said cationic polymer is the reaction product of an amine composition consisting of 98 mol percent of dimethylamine and 2 mol percent of ethylenediamine with an amount of epichlorohydrin which is equal to the full functionality of the two amines.

6. The process of claim 1 wherein said cationic polymer is poly(dimethyldiallylammonium chloride).

7. The process of claim 1 wherein said cationic polymer is a quaternarized derivative of poly(dimethylaminoethyl methacrylate).

8. The process of claim 1 wherein said polycationic polymer is poly[oxyethylene(dimethylimino)ethylene(dimethylimino)ethylene dichloride].

9. The process of claim 1 wherein said polyanionic polymer is a homopolymer of maleic acid and said polycationic polymer is the reaction product of an amine composition consisting of 98 mol percent of dimethylamine and 2 mol percent of ethylenediamine with an amount of epichlorohydrin which is equal to the full functionality of the two amines.

10. The process of claim 1 wherein said polyanionic polymer is a homopolymer of fumaric acid and said polycationic polymer is the reaction product of an amine composition consisting of 98 mol percent of dimethylamine and 2 mol percent of ethylenediamine with an amount of epichlorohydrin which is equal to the full functionality of the two amines.

* * * * *